April 27, 1965
T. W. AVERA
3,180,130
MANDREL FOR PREVENTING WRINKLING OF PIPES
DURING BENDING THEREOF
Filed April 9, 1962
2 Sheets-Sheet 1
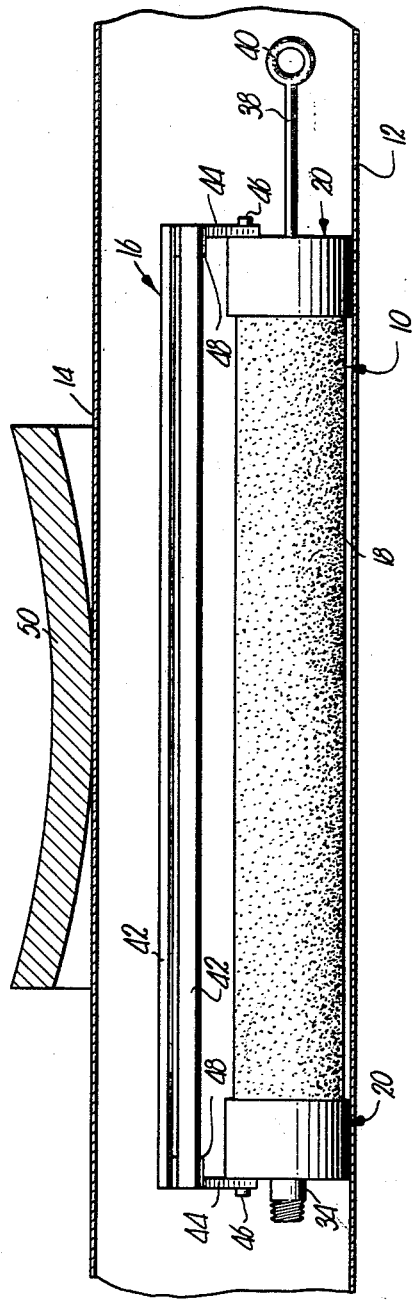
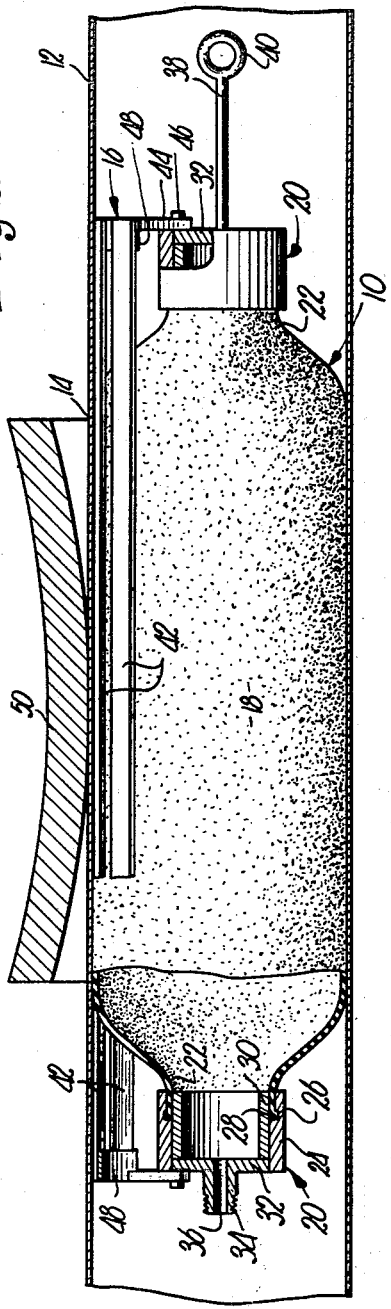
INVENTOR.
Trent W. Avera
BY
Hovey, Schmidt, Johnson & Hovey
ATTORNEYS.

April 27, 1965
T. W. AVERA
3,180,130
MANDREL FOR PREVENTING WRINKLING OF PIPES
DURING BENDING THEREOF
Filed April 9, 1962
2 Sheets-Sheet 2
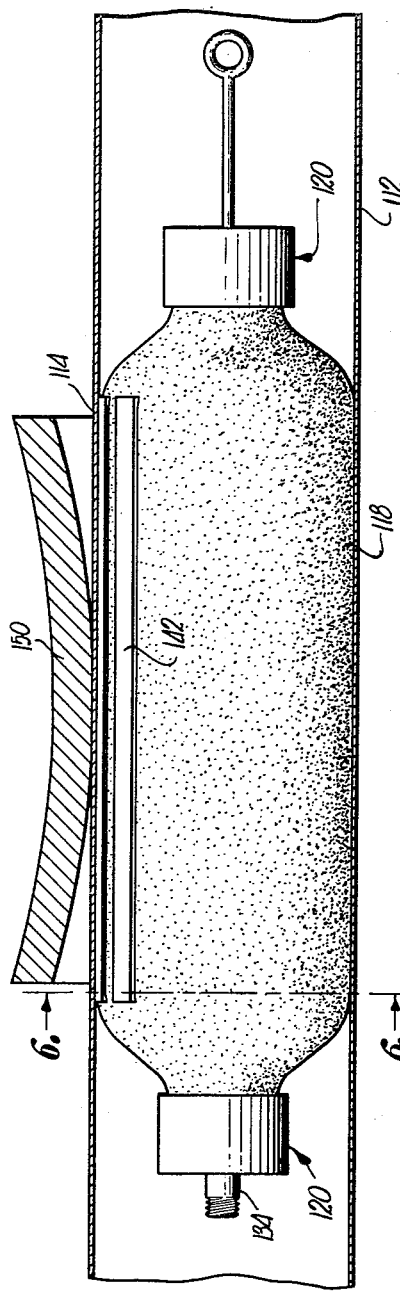
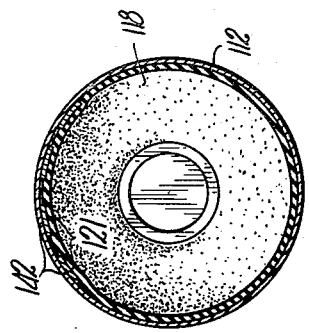
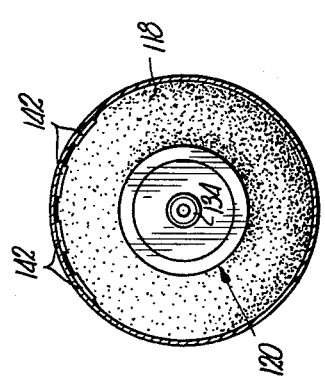
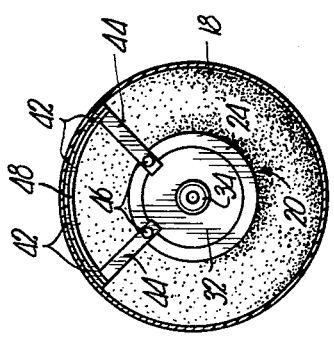
INVENTOR.
Trent W. Avera
BY
*Hovey, Schmidt, Johnson & Hovey*
ATTORNEYS.

United States Patent Office 3,180,130
Patented Apr. 27, 1965

3,180,130
MANDREL FOR PREVENTING WRINKLING OF PIPES DURING BENDING THEREOF
Trent W. Avera, Houston, Tex., assignor to Crose-Perrault Equipment Corporation, Tulsa, Okla., a corporation of Oklahoma
Filed Apr. 9, 1962, Ser. No. 185,991
10 Claims. (Cl. 72—465)

This invention relates to the field of pipe bending, and more particularly, to means for providing an internal backing for a length of pipe during bending thereof to prevent the formation of wrinkles therein.

In bending pipe of large diameter and suitable for long distance oil and gas transmission lines, it is the general practice to apply transverse bending forces at a pair of spaced points on the pipe so that the pipe will be bent transversely at a zone intermediate the points. Such bending of the pipe gives rise to wrinkles in the pipe at the zone of bending which weakens the pipe to the extent that the same may be ruptured under normal usage, and further, the cross section of the pipe is reduced to thereby form a constriction in the pipe. Heretofore, various devices and methods have been employed to prevent the formation of such wrinkles during bending of the pipe, but such measures have generally been unsuccessful or too laborious to be practical.

The present invention provides structure for internally engaging the pipe during the bending operation thereof so that wrinkles are prevented from being formed in the pipe during said operation to thereby maintain the original structural characteristics of the pipe and to assure a substantially uniform cross section in the pipe throughout the zone of bending thereof.

It is, therefore, the primary object of the present invention to provide structure adapted to be positioned within a pipe for preventing the formation of wrinkles in the pipe at the zone of contact of the bending apparatus and the pipe so that the pipe will not be structurally weakened or the cross section thereof will not be reduced as a result of the presence of such wrinkles therein.

A further object of the present invention is the provision of backing means engageable with the inner surface of a pipe at the zone of bending thereof to provide a support for the pipe during the bending operation thereof to thereby prevent the formation of the aforesaid wrinkles as a result of the interengagement of the pipe and backing means.

A further object of the present invention is the provision of structure of the aforesaid character which may be readily inserted within a pipe in backing relationship thereto at the zone of bending thereof and which does not require continuous or periodic manual adjustment once the structure is in the operating position thereof whereby the bending operation may be commenced and completed within a minimum of time without directing attention to the structure itself.

A further object of the present invention is the provision of inflatable structure which is utilized to force a number of backing members against the pipe to prevent the formation of the wrinkles when inflated, and which may be easily inserted in or removed from the pipe when deflated, thus rendering such structure suitable for use in the bending of relatively long lengths of pipe.

Other objects of this invention will become apparent as the following specification progresses, reference being had to the accompanying drawings, wherein:

FIGURE 1 is a side elevational view of one embodiment of the apparatus for preventing the wrinkling of pipe during the bending thereof and showing the position thereof within the pipe in a deflated or inoperative condition;

FIG. 2 is a side elevational view of the structure shown in FIG. 1 and illustrating the position thereof in an inflated or operative position, parts being boken away and in section to illustrate details of construction;

FIG. 3 is an end elevational view of the structure illustrated in FIG. 2;

FIG. 4 is a second embodiment of the present invention and illustrating the position thereof in an inflated or operative condition;

FIG. 5 is an elevational view of the structure illustrated in FIG. 4; and

FIG. 6 is a cross-sectional view taken along line 6—6 of FIG. 4.

The present invention provides inflatable structure adapted to be inserted in a pipe and located adjacent the zone of bending thereof prior to the application of a transverse bending force thereto. The inflatable structure carries a number of backing members movable into engagement with the pipe at said zone thereof when the structure is inflated to provide a backing for the pipe to prevent the formation of wrinkles therein during the bending operation thereof. One embodiment of the present invention utilizes coupling means for interconnecting the ends of the backing members to the inflatable structure and the second embodiment of the invention utilizes a number of grooves in the structure itself for receiving the backing members and for moving the same toward the zone of bending when the structure is inflated. After the pipe has been bent, the structure is deflated and removed from the pipe.

The embodiment of the invention illustrated in FIGS. 1 to 3 includes inflatable structure 10 adapted to be inserted within a pipe 12 adjacent the zone 14 of transverse bending thereof, and backing means 16 carried by structure 10 and movable therewith when the latter is inflated toward and into engagement with the inner surface of pipe 12 at zone 14 to provide a backing support for pipe 12 to thereby prevent the formation of wrinkles therein during the bending thereof.

Structure 10 includes an elongated, tubular bag 18 of resilient material such as rubber or the like, and having a diameter when deflated substantially less than the diameter of the pipe to be bent.

Closure means 20 is provided at each extremity of bag 18 for closing the open ends thereof, it being noted that bag 18 has a neck portion 22 at each extremity thereof. Closure means 20 includes an outer sleeve 24 having an annular groove 26 therein intermediate the ends thereof for receiving a flange 28 at the outer end of the corresponding neck portion 22. An inner sleeve 30 is disposed within sleeve 24 and maintains flange 28 within groove 26 thereof as is clear in FIG. 2. A plate 32 closes the open ends of sleeves 24 and 30 to make bag 18 airtight. One of the plates 32 is provided with a threaded projection 34 thereon and extending outwardly therefrom, plate 32 and projection 34 having a bore 36 therethrough for admitting a fluid into bag 18 to inflate the latter. Plate 32 at the opposite end of bag 18 is provided with a rod 38 thereon having an eyelet 40 secured thereto. Bag 18 may be readily inserted in or removed from pipe 12 by passing a suitable tool through eyelet 40 to force bag 18 in opposed directions.

Backing means 16 includes a number of elongated backing members 42 of yieldable material such as spring steel or the like. Mounting means in the nature of a pair of coupling elements 44 interconnect the ends of members 42 with the corresponding closure means 20 adjacent thereto. Elements 44 are secured at the innermost ends thereof to respective sleeves 24 by bolts 46 and at the outer ends thereof to an arcuate strip 48 in any suitable manner such as by welding or the like. The ends of members 42 are rigidly secured to strips 48 to thereby position members 42 longitudinally of bag 18 and in spaced relationship thereto when bag 18 is deflated as is clear in FIG. 1. As bag 18 receives fluid through bore 36, the bag is caused to inflate to thereby elevate closure means 20 at each extremity thereof and thereby advance backing members 42 into engagement with the inner surface of pipe 12.

In operation, a radial die 50 is moved into engagement with pipe 12 at the zone thereof at which it is desired to bend the pipe 12. Bag 18 is then moved into pipe 12 and is supported thereby below die 50. Fluid, such as oil, water or gas, is then directed into bag 18 to inflate the same and thereby move backing members 42 into engagement with the inner surface of pipe 12 below die 50. Upward transverse bending forces are applied to pipe 12 on either side of die 50 to cause pipe 12 to conform to the shape of the outer surface of die 50. During the bending operation, backing members 42 bend with pipe 12 and provide a backing support therefor throughout the bending operation to prevent the formation of wrinkles in pipe 12 at zone 14 thereof. There is no opportunity for the wrinkles to form, since the backing members 42 prevent any tendency for the pipe to bend transversely inwardly as a result of the compression applied thereto by the spaced, transverse bending forces thereon.

After pipe 12 has been bent to the desired degree, bag 18 is deflated by removing the fluid therefrom and backing members 42 are then moved out of engagement with the inner surface of pipe 12. Bag 18 then may be removed from the pipe.

The embodiment of the invention illustrated in FIGS. 4 to 6 inclusive, includes a bag 118 of resilient material such as rubber or the like, having closure means 120 at each extremity thereof. Closure means 120 correspond in all respects to closure means 20 of the embodiment illustrated in FIGS. 1 to 3.

Bag 118 is provided with a number of longitudinally extending grooves 121 therein at the periphery thereof for receiving a number of backing members 142 of yieldable material such as spring steel or the like. Grooves 121 are of a dimension such that when bag 118 is in an inflated condition, the dimensions of grooves 121 are substantially equal to that of members 142. Thus, when bag 118 is in a deflated condition, members 142 are gripped within grooves 121 and thus secured to bag 118.

In operation, bag 118 is inserted within a pipe 112 adjacent the zone 114 of transverse bending thereof. A radial die 150 is moved into engagement with pipe 112 at zone 114 thereof. Fluid is then directed into bag 118 through the bore in the projection 134 thereof to inflate bag 118 and thereby move backing members 142 into engagement with the inner surface of pipe 112 at zone 114 thereof. Transverse bending forces are then applied to pipe 112 on either side of die 150 to bend pipe 112 in a manner to conform to the outer convex surface of die 150. During the bending of pipe 112, backing members 142 bend therewith and thereby provide a backing support therefor throughout the bending operation thereof. Wrinkles are prevented from forming in pipe 112 at zone 114 thereof since members 142 prevent any tendency of pipe 112 to bend transversely inwardly. After pipe 112 has been bent to the desired degree, bag 118 is deflated by removing the fluid therefrom and bag 118 is then removed from pipe 112.

The present invention provides structure which may be readily inserted within or removed from a pipe of generally any length since the deflated dimensions of the bags 18 and 118 are substantially less than the diameter of the pipes to be bent thereby so that the same may be readily forced into and out of the pipe.

Having thus described the invention, what is claimed as new and desired to be secured by Letters Patent is:

1. Apparatus for preventing the wrinkling of pipe during transverse bending thereof, said apparatus comprising:
   (a) inflatable bag structure adapted to be positioned within said pipe adjacent the zone of bending thereof and disposed for movement toward said pipe when the structure is inflated; and
   (b) backing means carried by said structure and movable therewith for engaging said pipe at said zone, whereby said pipe is supported at said zone and thereby may be maintained in a wrinkle-free condition during bending thereof.

2. Apparatus for preventing the wrinkling of pipe during transverse bending thereof, said apparatus comprising:
   (a) inflatable bag structure adapted to be positioned within said pipe adjacent the zone of bending thereof and disposed for movement toward said pipe when the structure is inflated; and
   (b) a yieldable backing member carried by said structure and movable therewith, said member adapted to engage said pipe at said zone and to bend therewith to thereby support said pipe and prevent the wrinkling thereof as said pipe is being bent.

3. Apparatus for preventing the wrinkling of pipe during transverse bending thereof, said apparatus comprising:
   (a) elongated, inflatable bag structure adapted to be positioned within said pipe adjacent the zone of bending thereof and disposed for movement toward said pipe when the structure is inflated; and
   (b) an elongated backing member of yieldable material mounted on said structure and extending longitudinally thereof, said member being movable toward and into engagement with said pipe at said zone as said structure is inflated and being bendable with said pipe, whereby said member provides a support for said pipe at said zone to prevent the formation of wrinkles therein as the pipe is being bent.

4. Apparatus for preventing the wrinkling of pipe during transverse bending thereof, said apparatus comprising:
   (a) elongated, inflatable structure adapted to be longitudinally positioned within said pipe adjacent the zone of bending thereof and disposed for lateral movement toward said pipe when the structure is inflated;
   (b) a plurality of elongated backing members of yieldable material; and
   (c) means on said structure adjacent the extremities of the latter and operably coupled with the members at the ends thereof for mounting said members on said structure in positions to dispose said members for movement toward and into engagement with said pipe at said zone when said structure is inflated, whereby said members may be bent with said pipe to thereby provide a support therefor and prevent the formation of wrinkles therein as said pipe is being bent.

5. Apparatus for preventing the wrinkling of pipe as set forth in claim 4, wherein said material is spring steel.

6. Apparatus for preventing the wrinkling of pipe as set forth in claim 4, wherein said inflatable structure includes a bag of resilient material closed at the extremities thereof, said bag having a fluid-receiving opening therein adjacent one extremity thereof.

7. Apparatus for preventing the wrinkling of pipe as set forth in claim 4, wherein is included:
   (d) closure means carried by said structure at each extremity thereof and coupled with said mounting means for closing said structure and for moving said mounting means and thereby said members toward said zone as said structure is inflated.

8. Apparatus for preventing the wrinkling of pipe as set forth in claim 7, wherein said mounting means includes a coupling element secured to the closure means at each extremity and extending laterally therefrom, said elements being coupled with said members at corresponding ends thereof.

9. Appartus for preventing the wrinkling of pipe during transverse bending thereof, said apparatus comprising:
   (a) elongated, inflatable structure adapted to be longitudinally positioned within said pipe adjacent the zone of bending thereof and disposed for lateral movement toward said pipe when said structure is inflated; and
   (b) a plurality of elongated backing members of yieldable material, there being groove means in said structure for receiving at least a portion of each of said members to thereby mount the latter on said structure in positions to dispose said members for movement toward and into engagement with said pipe at said zone when said structure is inflated, whereby said members may be bent with said pipe to thereby provide a support therefor and prevent the formation of wrinkles therein as said pipe is being bent.

10. Apparatus for preventing the wrinkling of pipe as set forth in claim 9, wherein said structure includes a bag of resilient material, said bag having a plurality of longitudinally extending grooves therein presenting said groove means and disposed for complementally receiving said members.

References Cited by the Examiner

UNITED STATES PATENTS

| 410,534 | 9/89 | Cooper | 153—32 |
| 3,043,361 | 7/62 | Kelso | 153—63 |

MICHAEL V. BRINDISI, *Primary Examiner*.

CHARLES W. LANHAM, *Examiner*.